US012587245B2

(12) United States Patent
Zhou et al.

(10) Patent No.: US 12,587,245 B2
(45) Date of Patent: Mar. 24, 2026

(54) CHANNEL STATE INFORMATION REPORT FOR CROSS-LINK INTERFERENCE

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 17/643,287

(22) Filed: Dec. 8, 2021

(65) Prior Publication Data

US 2023/0179278 A1     Jun. 8, 2023

(51) Int. Cl.
| | |
|---|---|
| *H04B 7/06* | (2006.01) |
| *H04B 17/336* | (2015.01) |
| *H04L 5/14* | (2006.01) |

(52) U.S. Cl.
CPC ......... *H04B 7/0626* (2013.01); *H04B 7/0632* (2013.01); *H04B 17/336* (2015.01); *H04L 5/14* (2013.01)

(58) Field of Classification Search
CPC ... H04B 7/0626; H04B 17/336; H04B 7/0632
See application file for complete search history.

(56) References Cited

U.S. PATENT DOCUMENTS

| | | | | |
|---|---|---|---|---|
| 2020/0112420 A1* | 4/2020 | Xu | .......................... | H04W 72/23 |
| 2022/0053500 A1* | 2/2022 | Han | .................... | H04W 72/541 |
| 2022/0377747 A1* | 11/2022 | Yuan | .................... | H04B 7/0695 |
| 2023/0090986 A1* | 3/2023 | Jang | .................... | H04B 17/204 |
| | | | | 370/329 |
| 2023/0319605 A1* | 10/2023 | Park | .......................... | H04L 5/00 |
| | | | | 370/252 |

FOREIGN PATENT DOCUMENTS

WO     WO-2020144624 A1 *     7/2020

OTHER PUBLICATIONS

Ericsson, "Considerations on SRS-RSRP measurements for CLI", 3GPP TSG RAN WG4 Meeting #91, Reno, Nevada, USA, May 13-17, 2019, R4-1906886 (Year: 2019).*

* cited by examiner

*Primary Examiner* — Joseph A Bednash
(74) *Attorney, Agent, or Firm* — Harrity & Harrity, LLP

(57)     ABSTRACT

Various aspects of the present disclosure generally relate to wireless communication. In some aspects, a user equipment (UE) may receive a channel state information (CSI) configuration indicating an interference measurement resource (IMR) associated with cross-link interference (CLI). The UE may transmit a CSI report based at least in part on a measurement on the IMR associated with CLI. Numerous other aspects are described.

30 Claims, 9 Drawing Sheets

500

Receive a channel state information (CSI) configuration indicating an interference measurement resource (IMR) associated with cross-link interference (CLI)

610

Transmit a CSI report based at least in part on a measurement on the IMR associated with CLI

620

600

710 — Transmit, to a user equipment (UE), a channel state information (CSI) configuration indicating an interference measurement resource (IMR) associated with cross-link interference (CLI)

720 — Receive a CSI report based at least in part on a measurement on the IMR associated with CLI

700

CHANNEL STATE INFORMATION REPORT FOR CROSS-LINK INTERFERENCE

FIELD OF THE DISCLOSURE

Aspects of the present disclosure generally relate to wireless communication and to techniques and apparatuses for channel state information (CSI) reporting for cross-link interference (CLI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a channel state information (CSI) configuration indicating an interference measurement resource (IMR) associated with cross-link interference (CLI). The method may include transmitting a CSI report based at least in part on a measurement on the IMR associated with CLI.

Some aspects described herein relate to a method of wireless communication performed by a base station. The method may include transmitting, to a user equipment (UE), a channel state information (CSI) configuration indicating an interference measurement resource (IMR) associated with cross-link interference (CLI). The method may include receiving a CSI report based at least in part on a measurement on the IMR associated with CLI.

Some aspects described herein relate to a user equipment (UE) for wireless communication. The user equipment may include a memory and one or more processors coupled to the memory. The one or more processors may be configured to receive a channel state information (CSI) configuration indicating an interference measurement resource (IMR) associated with cross-link interference (CLI). The one or more processors may be configured to transmit a CSI report based at least in part on a measurement on the IMR associated with CLI.

Some aspects described herein relate to a base station for wireless communication. The base station may include a memory and one or more processors coupled to the memory. The one or more processors may be configured to transmit, to a user equipment (UE), a channel state information (CSI) configuration indicating an interference measurement resource (IMR) associated with cross-link interference (CLI). The one or more processors may be configured to receive a CSI report based at least in part on a measurement on the IMR associated with CLI.

Some aspects described herein relate to a non-transitory computer-readable medium that stores a set of instructions for wireless communication by a user equipment (UE). The set of instructions, when executed by one or more processors of the UE, may cause the UE to receive a channel state information (CSI) configuration indicating an interference measurement resource (IMR) associated with cross-link interference (CLI). The set of instructions, when executed by one or more processors of the UE, may cause the UE to transmit a CSI report based at least in part on a measurement on the IMR associated with CLI.

Some aspects described herein relate to a non-transitory computer-readable medium that stores a set of instructions for wireless communication by a base station. The set of instructions, when executed by one or more processors of the base station, may cause the base station to transmit, to a user equipment (UE), a channel state information (CSI) configuration indicating an interference measurement resource (IMR) associated with cross-link interference (CLI). The set of instructions, when executed by one or more processors of the base station, may cause the base station to receive a CSI report based at least in part on a measurement on the IMR associated with CLI.

Some aspects described herein relate to an apparatus for wireless communication. The apparatus may include means for receiving a channel state information (CSI) configuration indicating an interference measurement resource (IMR) associated with cross-link interference (CLI). The apparatus may include means for transmitting a CSI report based at least in part on a measurement on the IMR associated with CLI.

Some aspects described herein relate to an apparatus for wireless communication. The apparatus may include means for transmitting, to a user equipment (UE), a channel state information (CSI) configuration indicating an interference measurement resource (IMR) associated with cross-link interference (CLI). The apparatus may include means for receiving a CSI report based at least in part on a measurement on the IMR associated with CLI.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
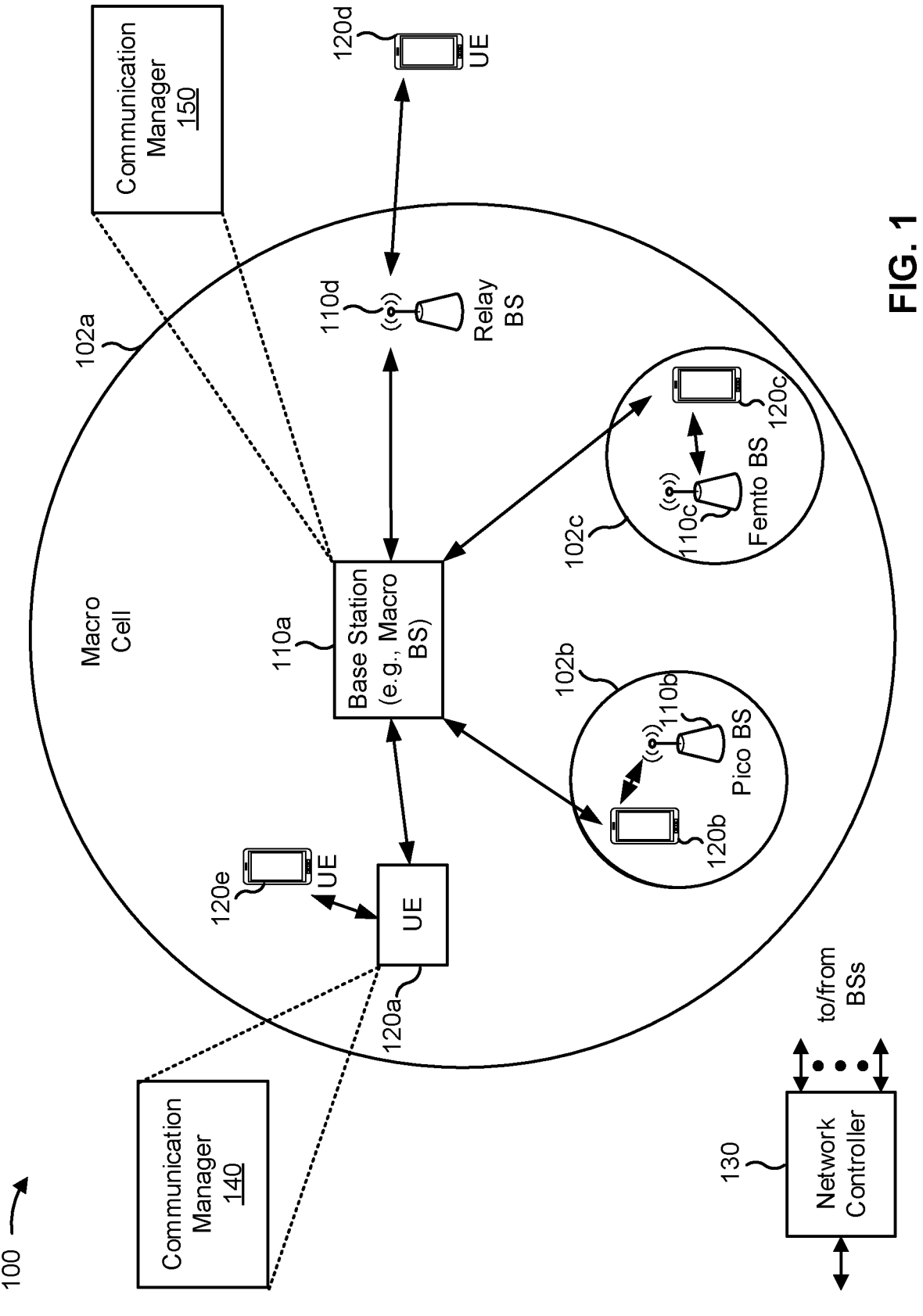
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a channel state information (CSI) configuration indicating an interference measurement resource (IMR) associated with cross-link interference (CLI); and transmit a CSI report based at least in part on a measurement on the IMR associated with CLI. Additionally, or alternatively, the communication manager 140 may perform one or more other operations described herein.

In some aspects, the base station 110 may include a communication manager 150. As described in more detail elsewhere herein, the communication manager 150 may transmit, to a user equipment (UE), a channel state information (CSI) configuration indicating an interference measurement resource (IMR) associated with cross-link interference (CLI); and receive a CSI report based at least in part on a measurement on the IMR associated with CLI. Additionally, or alternatively, the communication manager 150 may perform one or more other operations described herein.

As indicated above, FIG. 1 is provided as an example. Other examples may differ from what is described with regard to FIG. 1.

Figure 2:
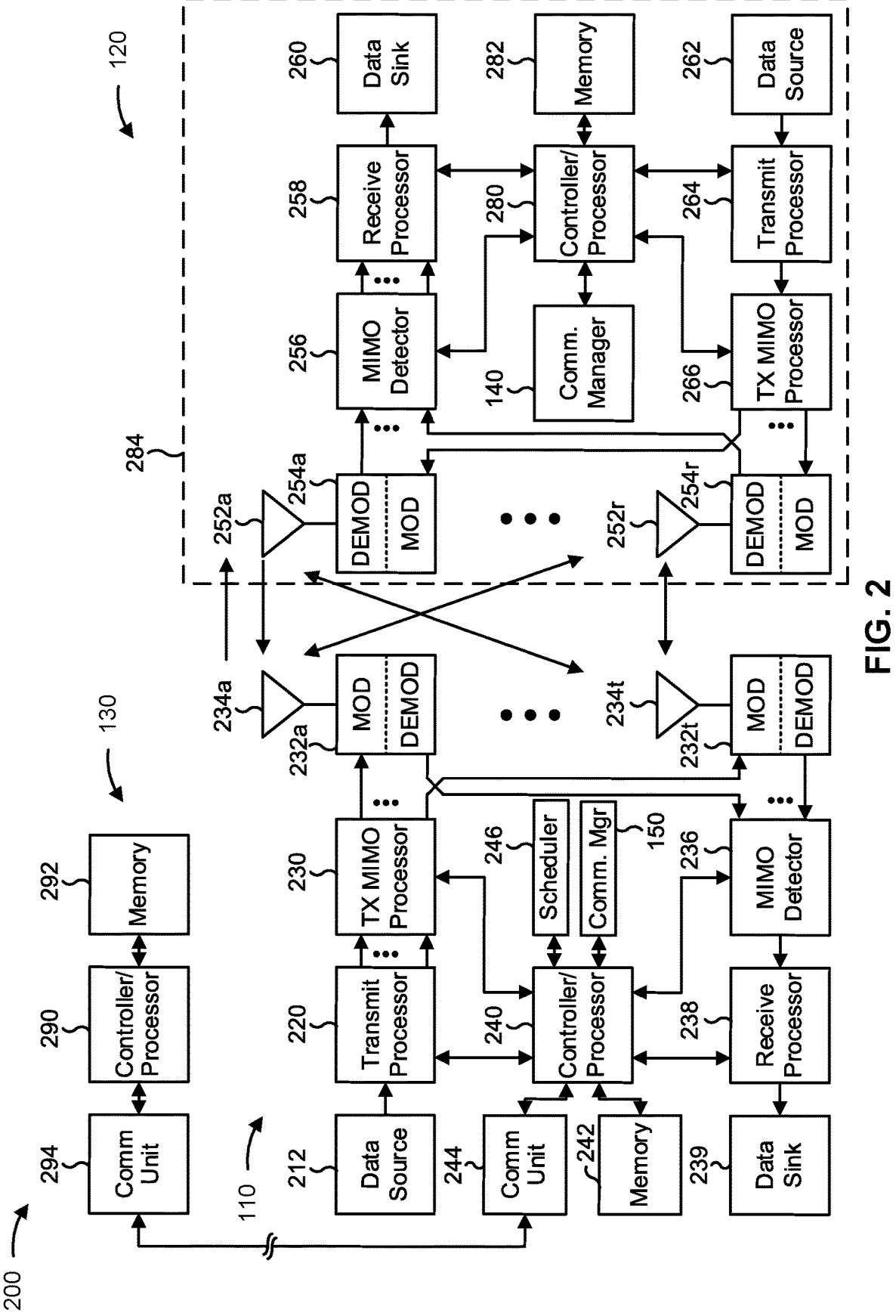
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with CSI reporting for CLI, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the user equipment (UE) includes means for receiving a channel state information (CSI) configuration indicating an interference measurement resource (IMR) associated with cross-link interference (CLI); and/or means for transmitting a CSI report based at least in part on a measurement on the IMR associated with CLI. The means for the user equipment (UE) to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a user equipment (UE), a channel state information (CSI) configuration indicating an interference measurement resource (IMR) associated with cross-link interference (CLI); and/or means for receiving a CSI report based at least in part on a measurement on the IMR associated with CLI. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figures 3A, 3B, 3C:
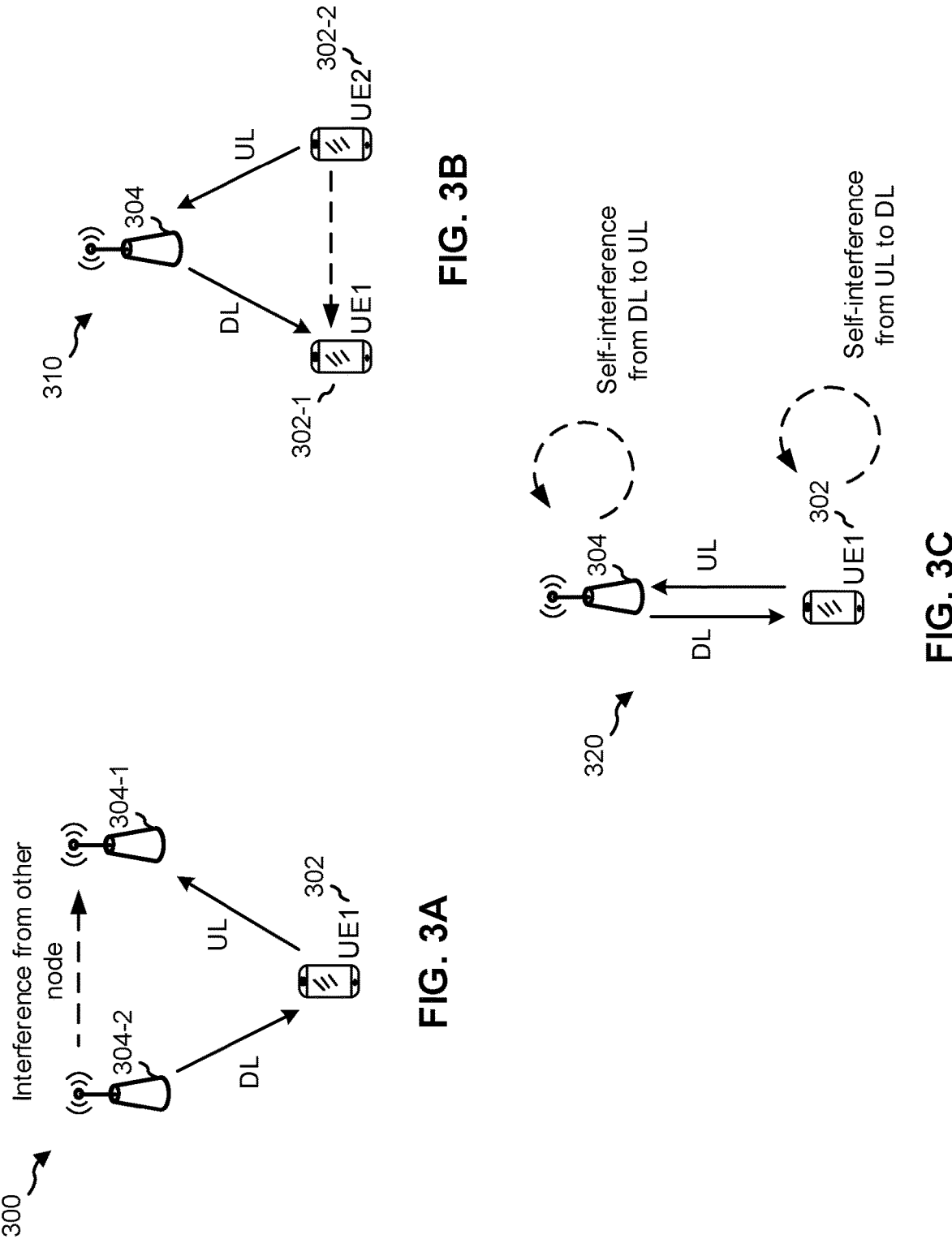
FIGS. 3A-3C are diagrams illustrating examples of full duplex (FD) communication in accordance with the present disclosure.

FIGS. 3A-3C are diagrams illustrating examples 300, 310, 320 of full duplex (FD) communication in accordance with the present disclosure. An FD communication is a communication that utilizes overlapped time resources at a single node (such as a UE or a base station) for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG), as described in more detail in connection with FIG. 4.

The example 300 of FIG. 3A includes a UE1 302 and two base stations (e.g., TRPs) 304-1, 304-2, wherein the UE1 302 is sending UL transmissions to base station 304-1 and is receiving DL transmissions from base station 304-2. In the example 300 of FIG. 3A, FD is enabled for the UE1 302, but not for the base stations 304-1, 304-2. Thus, the base stations 304-1 and 304-2 are half duplex (HD) base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UE1 302-1 and UE2 302-2. Thus, the UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304. In the example 320 of FIG. 3C, the UE1 302 and the base station 304 communicate using a beam pair. A beam pair may include a downlink beam and an uplink beam. For example, a UE1 302 may use a beam pair that includes a downlink beam (that is, a receive beam) at the UE1 302 and an uplink beam (that is, a transmit beam) at the UE1 302 to communicate with the base station 304. The base station 304 may use a downlink beam (that is, a transmit beam) at the base station 304 to transmit communications received via the UE1 302's downlink beam, and may use an uplink beam (that is, a receive beam) at the base station 304 to receive communications transmitted via the UE1 302's uplink beam.

In FIGS. 3A-3C, interference is indicated by dashed lines. Interference can occur between nodes of examples 300, 310, 320 (referred to as "cross-link interference" (CLI)). Examples of CLI are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 302 (from an uplink transmission to a downlink reception) and at a BS 304 (from a downlink transmission to an uplink reception) are shown in FIG. 3C. It should be noted that the above-described CLI and self-interference conditions can occur in HD deployments and in FD deployments.

As indicated above, FIGS. 3A-3C are provided as one or more examples. Other examples may differ from what is described with regard to FIGS. 3A-3C.

Figure 4:
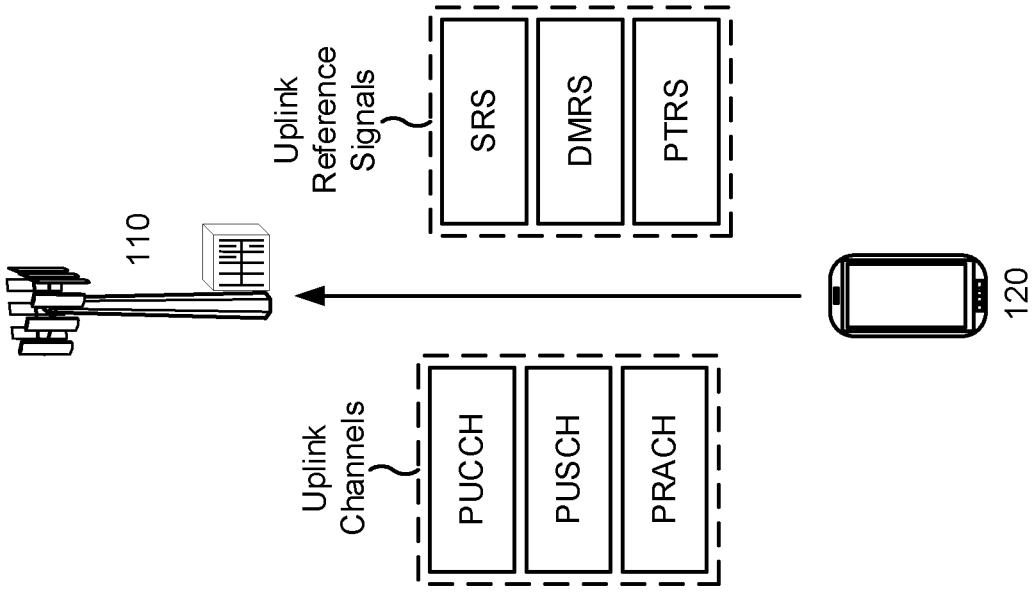
FIG. 4 is a diagram illustrating an example of physical channels and reference signals in a wireless network, in accordance with the present disclosure.
Figure 4:
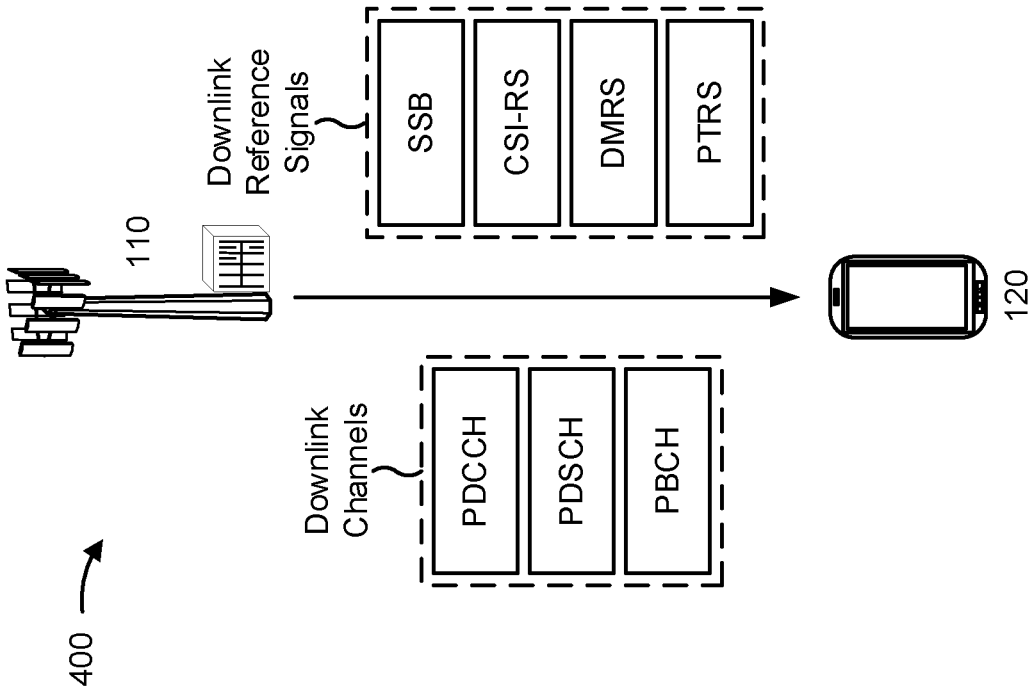

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As mentioned above, UEs communicating with a full-duplex (FD) base station (as in example 310 of FIG. 3) may experience CLI. For example, a first UE's uplink transmission may cause CLI with regard to a second UE's downlink transmission. This CLI can be exacerbated by the use of certain beams for transmission or reception of communications, such as if the first UE's transmit beam is aligned with the second UE's receive beam. If the base station is unaware of CLI caused by the second UE, the base station may select inappropriate resources for FD communication with the UEs, thereby causing CLI between the first UE, which reduces throughput and reliability of communications with the first UE. Furthermore, traditional forms of CSI provide for channel measurement (such as based at least in part on a channel measurement resource (CMR)) and interference measurement for downlink interference (such as based at least in part on an interference measurement resource (IMR) in which a CSI-RS is transmitted) but may not provide for measurement of CLI.

Some techniques and apparatuses described herein provide CSI reporting based at least in part on CLI. For example, a UE may be configured with an IMR that is associated with CLI (e.g., dedicated for measurement of CLI). The UE may measure CLI in the IMR, such as based at least in part on a reference signal or another transmission of another UE. The UE may report a CSI metric, which may take into account the measurement of the CLI. A base station may use the CSI metric to schedule communications of the UE, such as FD communications of the UE and another UE. In some aspects, the base station may configure the CSI reporting for particular receive beams of the UE, such that the base station can identify a suitable set of beams (e.g., transmit beams and/or receive beams) for communications of the UE. For example, the suitable set of beams may be selected to minimize CLI, to reduce CLI to below a threshold value, to eliminate CLI, or the like. In this way, the occurrence of CLI is reduced, which improves reliability and throughput of communications, particularly FD communications.

As indicated above, FIG. 4 is provided as an example. Other examples may differ from what is described with regard to FIG. 4.

Figure 5:
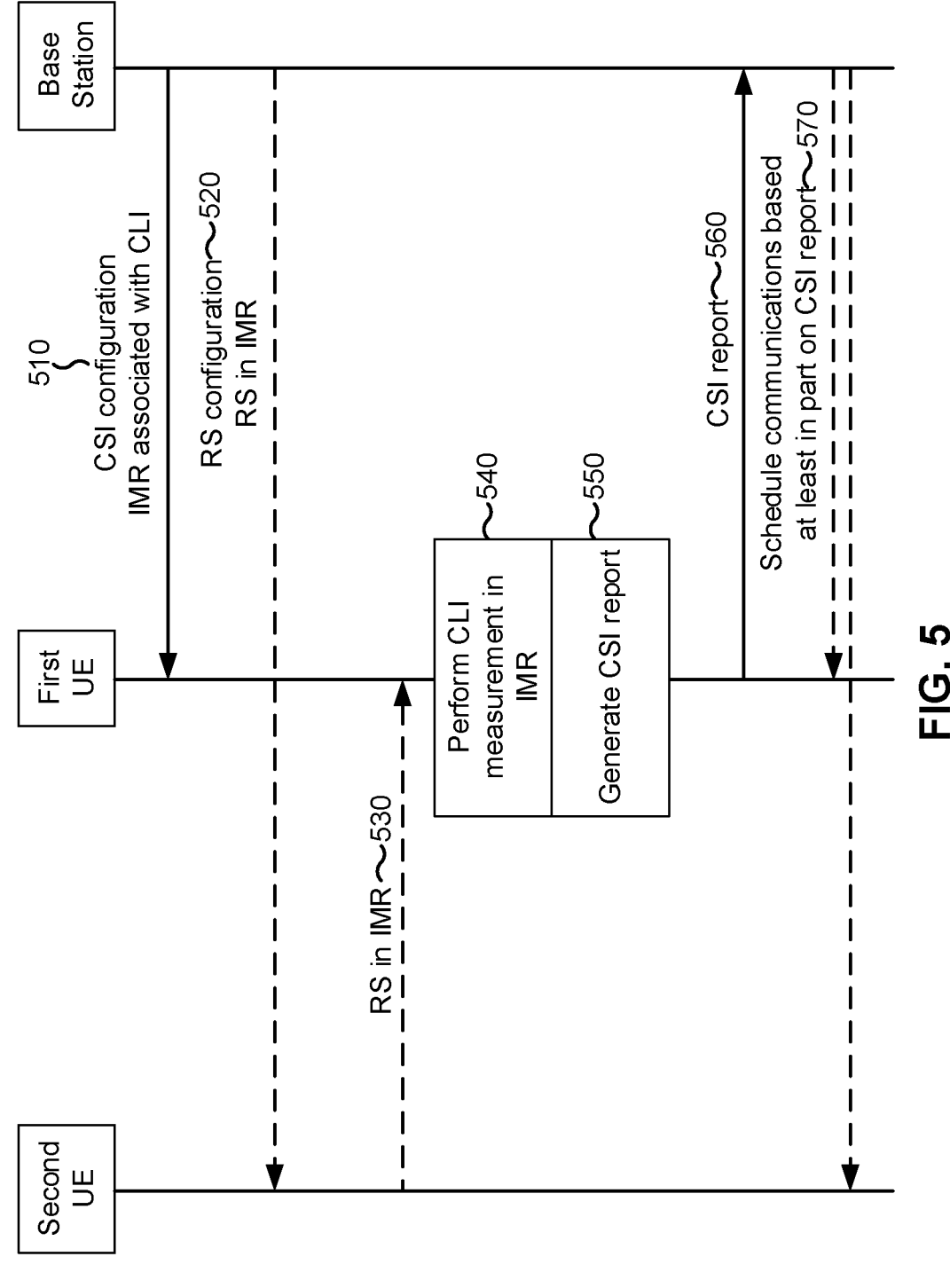
FIG. 5 is a diagram illustrating an example of configuration of channel state information (CSI) reporting for CLI, in accordance with the present disclosure.

FIG. 5 is a diagram illustrating an example 500 of configuration of CSI reporting for CLI, in accordance with the present disclosure. Example 500 includes a first UE (e.g., UE 120, UE 302), a second UE (e.g., UE 120, UE 302), and a base station (e.g., BS 110, BS 304).

As shown by reference number 510, the base station may transmit, and the first UE may receive, a CSI configuration. For example, the CSI configuration may be transmitted via radio resource control (RRC) signaling, medium access control (MAC) signaling, downlink control information (DCI), or a combination thereof. In some aspects, the CSI configuration may include a CSI report configuration. In some aspects, the CSI configuration may include conditions for reporting CSI, resources for use to report CSI, or the like.

As shown, the CSI configuration may indicate an IMR associated with CLI. For example, the CSI configuration may indicate an IMR that is dedicated for measurement of CLI by the first UE. An IMR is a resource configured for interference measurement. An IMR associated with CLI is a resource that is configured for measurement of CLI. In example 500, the CLI is measured by the first UE, and is associated with transmissions of (at least) the second UE. In some aspects, the CSI configuration may also indicate a CMR, an IMR associated with downlink interference, a combination thereof, or the like.

In some aspects, the IMR associated with CLI may be a zero power (ZP) IMR. In a ZP IMR, the base station may not transmit a physical downlink shared channel to the first UE, thereby facilitating measurement of CLI by the first UE. In some aspects, the IMR associated with CLI may be a non-ZP (NZP) IMR. In an NZP IMR, a second UE may transmit a reference signal (such as a sounding reference signal (SRS) or an uplink demodulation reference signal (DMRS)) to facilitate measurement of CLI by the first UE, as described below.

In some aspects, the CSI configuration (or another configuration) may indicate whether to take into account the IMR associated with CLI (or the measurement of the IMR associated with CLI) when reporting CSI. For example, the UE may determine a CSI metric, such as an RI, a PMI, a CQI, a Layer 1 signal to interference plus noise ratio (SINR) or the like. In some aspects, the UE may take the measurement on the IMR associated with CLI into account when determining the CSI metric. In some other aspects, the UE may not take the measurement on the IMR associated with CLI into account when determining the metric. The UE may be configured to report the CSI metric that does not take into account the measurement on the IMR associated with CLI, the CSI metric that takes into account the measurement on the IMR associated with CLI, or both. Thus, the UE can provide CSI reporting based at least in part on multiple different CSI metrics, and the base station can interpret the CSI reporting based at least in part on multiple different hypotheses (such as taking into account the IMR for CLI and/or not taking into account the IMR for CLI), which improves scheduling and other decisions of the base station that are based on the CSI reporting.

In some aspects, the CSI configuration (or another configuration) may indicate one or more receive beams. For example, the CSI configuration may indicate a set of receive beams (e.g., one or more receive beams) for which the UE is to determine a CSI metric based at least in part on the IMR associated with CLI. In some aspects, each beam of the set of receive beams may be configured with a respective IMR associated with CLI. In some aspects, the UE may be configured with a single IMR associated with CLI, and the UE may perform a measurement of the single IMR associated with CLI using each receive beam of the set of receive beams. In some aspects, the CSI configuration may indicate to report a CSI metric (as described above) for the set of receive beams. For example, the UE may be configured with one or more sets of CSI metrics to be reported. Each set of CSI metrics, of the one or more set of CSI metrics, may correspond to a receive beam of the set of receive beams. The UE may determine each set of CSI metrics of the one or more sets of CSI metrics. The UE may report the one or more sets of CSI metrics regarding the set of receive beams. Thus, the base station can identify receive beams that may (or may not) be suitable for communication by the first UE due to CLI.

As shown by reference number 520, in some aspects, the base station may configure the second UE to transmit a reference signal. For example, the base station may configure the second UE to transmit a reference signal to facilitate the measurement of the CLI by the first UE. In some aspects, the base station may configure the second UE to transmit an SRS. In some aspects, the base station may configure the second UE to transmit an uplink DMRS. The base station may configure the second UE to transmit the reference signal in an IMR associated with CLI (such as an IMR associated with CLI configured for the first UE). In some aspects, the base station may configure the second UE to transmit the reference signal on a particular transmit beam or a particular set of transmit beams (e.g., in sequence), which may facilitate the identification, by the base station, of transmit beams (or combinations of a transmit beam at the second UE and a receive beam at the first UE) that are suitable, or that are unsuitable, for communication (such as FD communication). As shown by reference number 530, in some aspects, the second UE may transmit the reference signal. For example, the second UE may transmit the reference signal based at least in part on the signaling shown by reference number 520.

As shown by reference number 540, the first UE may perform a measurement in the IMR associated with CLI. The UE may perform the measurement in accordance with the CSI configuration shown by reference number 510. In some aspects, the first UE may perform a CLI measurement. In some aspects, the first UE may perform the measurement based at least in part on the reference signal shown by reference number 520. For example, the first UE may determine a measurement by measuring a property of the reference signal in the IMR associated with CLI. In some other aspects, the first UE may perform a CLI measurement without having received a reference signal from the second UE. For example, the first UE may determine a measurement on the IMR associated with CLI without reference to a particular reference signal. In some aspects, the first UE may perform multiple measurements, such as measurements on multiple IMRs associated with CLI, on multiple receive beams, or the like.

As shown by reference number 550, the first UE may generate a CSI report. For example, the first UE may generate a CSI report indicating one or more CSI metrics based at least in part on the measurement(s) performed in connection with reference number 540. In some aspects, the CSI report may include at least one of a CSI metric based at least in part on the measurement on the IMR associated with CLI, a CSI metric not based on the measurement on the IMR associated with CLI, or a combination thereof. As shown by reference number 560, the first UE may transmit the CSI report. In some aspects, the first UE may transmit the CSI report using a resource indicated by the CSI configuration.

In some aspects, the CSI report may be based at least in part on multiple different CSI metrics. For example, the CSI report may indicate values of CSI metrics associated with any one or more of a CMR, an IMR associated with CLI, or an IMR associated with downlink interference. As one example, the CSI report may include a CSI metric based at least in part on a CMR measurement for downlink RSRP of signal quality via the first UE's receive beam, a CSI metric based at least in part on an IMR measurement for downlink interference for downlink cross-beam interference and inter-cell interference via the first UE's receive beam, and a CSI metric based at least in part on a CLI measurement via the first UE's receive beam (e.g., an interference signal used for the CLI measurement may be configured to be transmitted by one or more neighbor uplink UEs including the second UE)

As shown by reference number 570, the base station may schedule communications based at least in part on the CSI report. For example, the base station may identify a suitable resource for a communication by the first UE and/or the second UE based at least in part on the CSI report, and may transmit scheduling information scheduling a communication using the suitable resource. As another example, the base station may schedule FD communication based at least in part on the CSI report. For example, the base station may identify resources and/or beams (e.g., transmit beams and/or receive beams) that are suitable for FD operation based at least in part on the CSI report, and may schedule communications that use the resources and/or beams. In this way, CLI can be taken into account for scheduling of communications (such as, though not exclusively, FD communications), which reduces interference, increases throughput, and improves reliability.

As indicated above, FIG. 5 is provided as an example. Other examples may differ from what is described with regard to FIG. 5.

Figure 6:
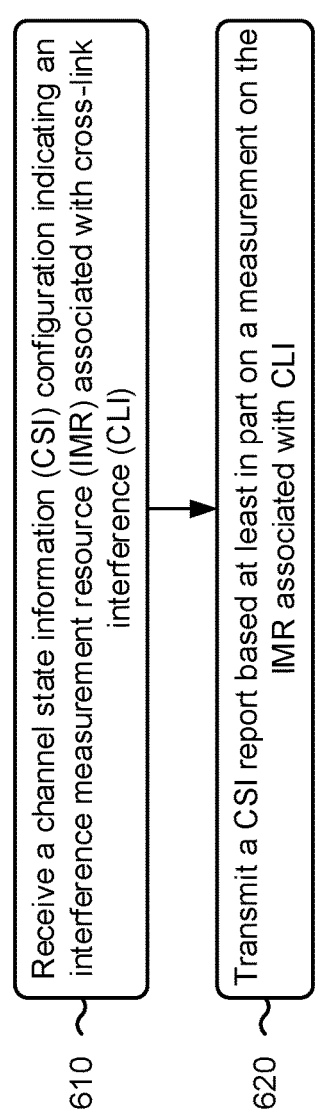
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with channel state information reporting for cross-link interference.

As shown in FIG. 6, in some aspects, process 600 may include receiving a CSI configuration indicating an IMR associated with CLI) (block 610). For example, the UE (e.g., using communication manager 140 and/or reception component 802, depicted in FIG. 8) may receive a CSI configuration indicating an IMR associated with CLI, as described above.

As further shown in FIG. 6, in some aspects, process 600 may include transmitting a CSI report based at least in part on a measurement on the IMR associated with CLI (block 620). For example, the UE (e.g., using communication manager 140 and/or transmission component 804, depicted in FIG. 8) may transmit a CSI report based at least in part on a measurement on the IMR associated with CLI, as described above.

Process 600 may include additional aspects, such as any single aspect or any combination of aspects described below and/or in connection with one or more other processes described elsewhere herein.

In a first aspect, process 600 includes receiving configuration information indicating whether the CSI report is to be based at least in part on the measurement on the IMR associated with CLI.

In a second aspect, alone or in combination with the first aspect, the CSI report includes a first CSI metric that is not based at least in part on the measurement on the IMR associated with CLI and a second CSI metric that is based at least in part on the measurement on the IMR associated with CLI.

In a third aspect, alone or in combination with one or more of the first and second aspects, the first CSI metric is based at least in part on at least one of a channel measurement resource or an IMR for downlink interference.

In a fourth aspect, alone or in combination with one or more of the first through third aspects, the CSI report includes a CSI metric based at least in part on the measurement on the IMR associated with CLI, wherein the CSI metric comprises at least one of a Layer 1 signal-to-interference-plus-noise ratio (SINR) metric, a channel quality information metric, a precoding matrix indicator metric, a rank indicator metric, or some combination thereof.

In a fifth aspect, alone or in combination with one or more of the first through fourth aspects, the CSI configuration indicates a set of receive beams of the UE associated with the IMR associated with CLI.

In a sixth aspect, alone or in combination with one or more of the first through fifth aspects, the CSI report includes a first CSI metric associated with a first receive beam of the set of receive beams and a second CSI metric associated with a second receive beam of the set of receive beams.

In a seventh aspect, alone or in combination with one or more of the first through sixth aspects, the IMR associated with CLI is a zero power IMR.

In an eighth aspect, alone or in combination with one or more of the first through seventh aspects, the IMR associated with CLI is a non-zero power IMR.

In a ninth aspect, alone or in combination with one or more of the first through eighth aspects, the measurement is on a sounding reference signal transmitted in the IMR.

In a tenth aspect, alone or in combination with one or more of the first through ninth aspects, the measurement is on an uplink demodulation reference signal transmitted in the IMR.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
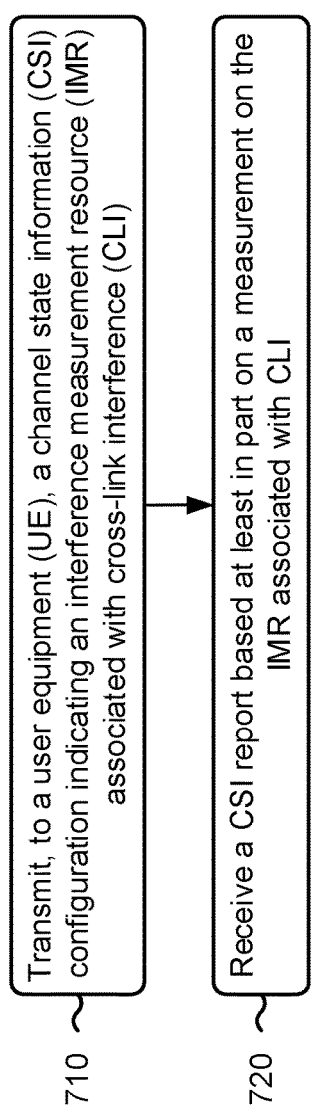
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with channel state information reporting for cross-link interference.

As shown in FIG. 7, in some aspects, process 700 may include transmitting, to a UE, a CSI configuration indicating an IMR associated with CLI (block 710). For example, the base station (e.g., using communication manager 150 and/or transmission component 904, depicted in FIG. 9) may transmit, to a UE, a CSI configuration indicating an IMR associated with CLI, as described above.

As further shown in FIG. 7, in some aspects, process 700 may include receiving a CSI report based at least in part on a measurement on the IMR associated with CLI (block 720). For example, the base station (e.g., using communication manager 150 and/or reception component 902, depicted in FIG. 9) may receive a CSI report based at least in part on a measurement on the IMR associated with CLI, as described above.

Process 700 may include additional aspects, such as any single aspect or any combination of aspects described below and/or in connection with one or more other processes described elsewhere herein.

In a first aspect, process 700 includes transmitting scheduling information based at least in part on the CSI report.

In a second aspect, alone or in combination with the first aspect, the UE is a first UE, wherein the scheduling information relates to at least one of the first UE or a second UE, and wherein the base station communicates with the first UE and the second UE in a full duplex fashion.

In a third aspect, alone or in combination with one or more of the first and second aspects, process 700 includes transmitting configuration information indicating whether the CSI report is to be based at least in part on the measurement on the IMR associated with CLI.

In a fourth aspect, alone or in combination with one or more of the first through third aspects, the CSI report includes a first CSI metric that is not based at least in part on the measurement on the IMR associated with CLI and a second CSI metric that is based at least in part on the measurement on the IMR associated with CLI.

In a fifth aspect, alone or in combination with one or more of the first through fourth aspects, the first CSI metric is based at least in part on at least one of a channel measurement resource or an IMR for downlink interference.

In a sixth aspect, alone or in combination with one or more of the first through fifth aspects, the CSI report includes a CSI metric based at least in part on the measurement on the IMR associated with CLI, wherein the CSI metric comprises at least one of a Layer 1 signal-to-interference-plus-noise ratio (SINR) metric, a channel quality information metric, a precoding matrix indicator metric, a rank indicator metric, or some combination thereof.

In a seventh aspect, alone or in combination with one or more of the first through sixth aspects, the CSI configuration indicates a set of receive beams of the UE associated with the IMR associated with CLI.

In an eighth aspect, alone or in combination with one or more of the first through seventh aspects, the CSI report includes a first CSI metric associated with a first receive beam of the set of receive beams and a second CSI metric associated with a second receive beam of the set of receive beams.

In a ninth aspect, alone or in combination with one or more of the first through eighth aspects, the IMR associated with CLI is a zero power IMR.

In a tenth aspect, alone or in combination with one or more of the first through ninth aspects, the IMR associated with CLI is a non-zero power IMR.

In an eleventh aspect, alone or in combination with one or more of the first through tenth aspects, the UE is a first UE, and wherein the method further comprises configuring a second UE to transmit a sounding reference signal in the IMR.

In a twelfth aspect, alone or in combination with one or more of the first through eleventh aspects, the UE is a first UE, and wherein the method further comprises configuring a second UE to transmit an uplink demodulation reference signal in the IMR.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
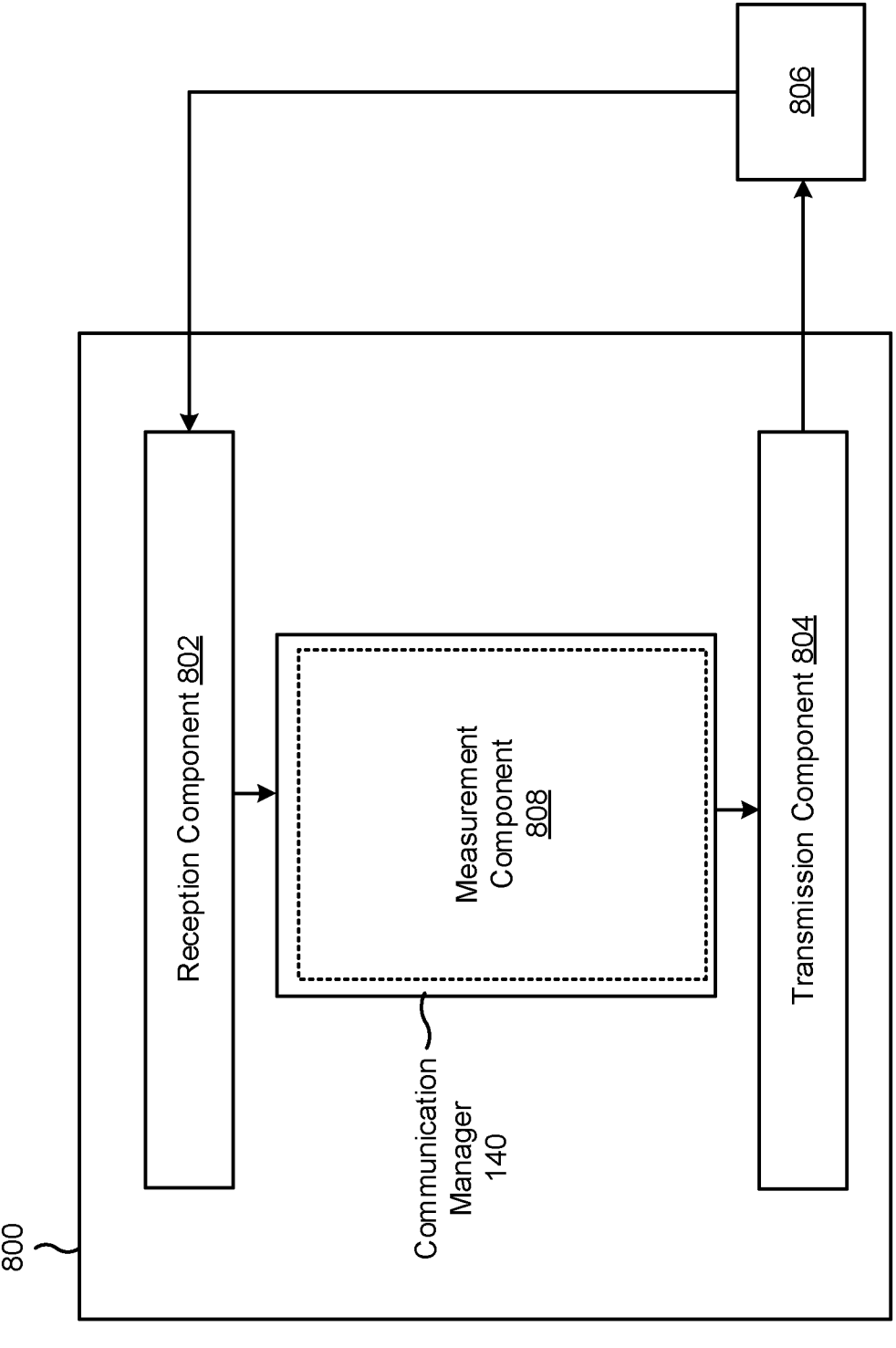
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a measurement component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a channel state information (CSI) configuration indicating an interference measurement resource (IMR) associated with cross-link interference (CLI). The transmission component 804 may transmit a CSI report based at least in part on a measurement on the IMR associated with CLI. The measurement component 808 may perform the measurement on the IMR associated with CLI.

The reception component 802 may receive configuration information indicating whether the CSI report is to be based at least in part on the measurement on the IMR associated with CLI.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
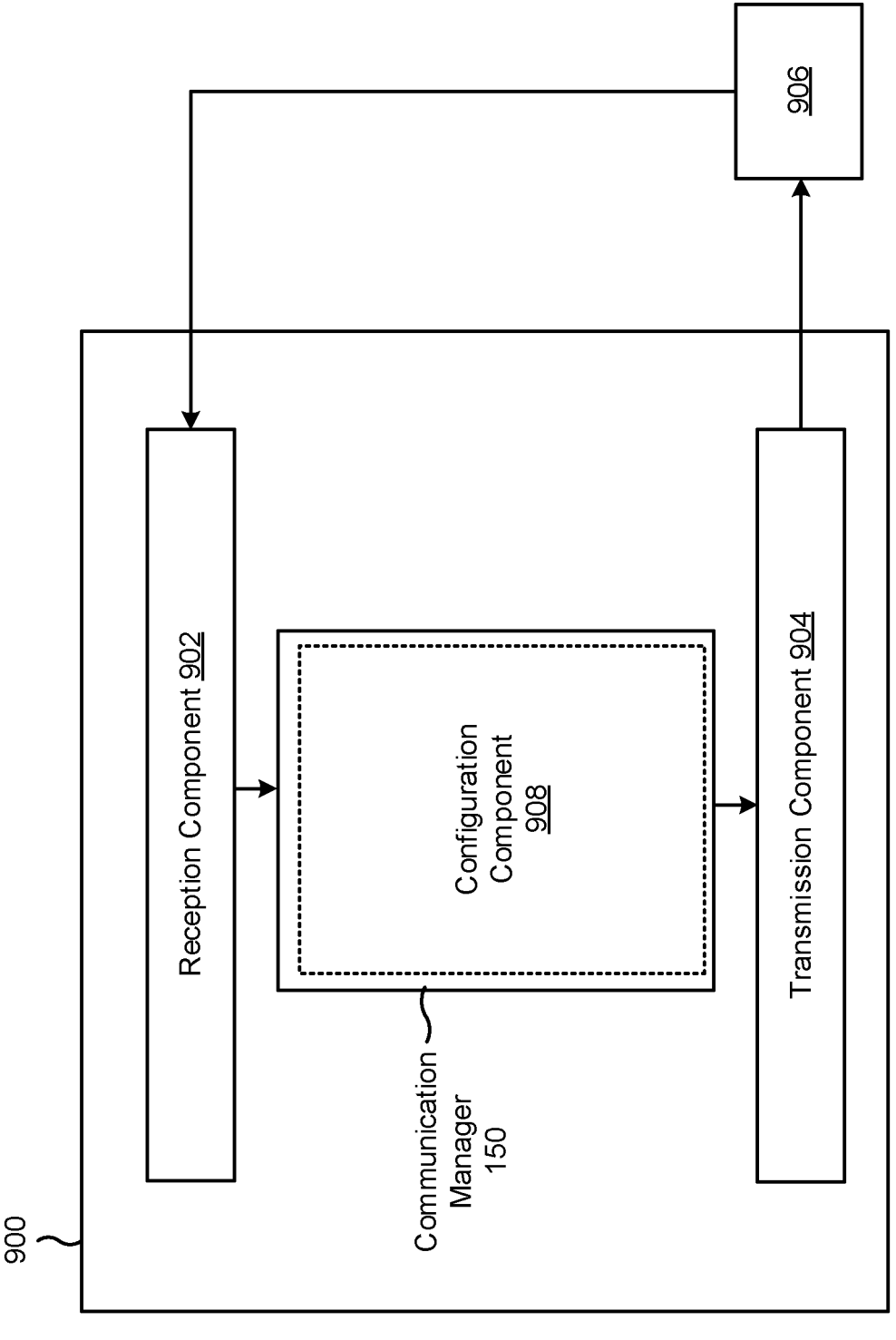
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a configuration component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 or the configuration component 908 may transmit, to a user equipment (UE), a channel state information (CSI) configuration indicating an interference measurement resource (IMR) associated with cross-link interference (CLI). The reception component 902 may receive a CSI report based at least in part on a measurement on the IMR associated with CLI.

The transmission component 904 may transmit scheduling information based at least in part on the CSI report.

The transmission component 904 or the configuration component 908 may transmit configuration information indicating whether the CSI report is to be based at least in part on the measurement on the IMR associated with CLI.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a channel state information (CSI) configuration indicating an interference measurement resource (IMR) associated with cross-link interference (CLI); and transmitting a CSI report based at least in part on a measurement on the IMR associated with CLI.

Aspect 2: The method of Aspect 1, further comprising receiving configuration information indicating whether the CSI report is to be based at least in part on the measurement on the IMR associated with CLI.

Aspect 3: The method of Aspect 2, where the CSI report includes a first CSI metric that is not based at least in part on the measurement on the IMR associated with CLI and a second CSI metric that is based at least in part on the measurement on the IMR associated with CLI.

Aspect 4: The method of Aspect 3, wherein the first CSI metric is based at least in part on at least one of a channel measurement resource or an IMR for downlink interference.

Aspect 5: The method of any of Aspects 1-4, wherein the CSI report includes a CSI metric based at least in part on the measurement on the IMR associated with CLI, wherein the CSI metric comprises at least one of: a Layer 1 signal-to-interference-plus-noise ratio (SINR) metric, a channel quality information metric, a precoding matrix indicator metric, a rank indicator metric, or some combination thereof.

Aspect 6: The method of any of Aspects 1-5, wherein the CSI configuration indicates a set of receive beams of the UE associated with the IMR associated with CLI.

Aspect 7: The method of Aspect 6, wherein the CSI report includes a first CSI metric associated with a first receive beam of the set of receive beams and a second CSI metric associated with a second receive beam of the set of receive beams.

Aspect 8: The method of any of Aspects 1-7, wherein the IMR associated with CLI is a zero power IMR.

Aspect 9: The method of any of Aspects 1-8, wherein the IMR associated with CLI is a non-zero power IMR.

Aspect 10: The method of Aspect 9, wherein the measurement is on a sounding reference signal transmitted in the IMR.

Aspect 11: The method of Aspect 9, wherein the measurement is on an uplink demodulation reference signal transmitted in the IMR.

Aspect 12: A method of wireless communication performed by a base station, comprising: transmitting, to a user equipment (UE), a channel state information (CSI) configuration indicating an interference measurement resource (IMR) associated with cross-link interference (CLI); and receiving a CSI report based at least in part on a measurement on the IMR associated with CLI.

Aspect 13: The method of Aspect 12, further comprising: transmitting scheduling information based at least in part on the CSI report.

Aspect 14: The method of Aspect 13, wherein the UE is a first UE, wherein the scheduling information relates to at least one of the first UE or a second UE, and wherein the base station communicates with the first UE and the second UE in a full duplex fashion.

Aspect 15: The method of any of Aspects 12-14, further comprising transmitting configuration information indicating whether the CSI report is to be based at least in part on the measurement on the IMR associated with CLI.

Aspect 16: The method of Aspect 15, where the CSI report includes a first CSI metric that is not based at least in part on the measurement on the IMR associated with CLI and a second CSI metric that is based at least in part on the measurement on the IMR associated with CLI.

Aspect 17: The method of Aspect 16, wherein the first CSI metric is based at least in part on at least one of a channel measurement resource or an IMR for downlink interference.

Aspect 18: The method of any of Aspects 12-17, wherein the CSI report includes a CSI metric based at least in part on the measurement on the IMR associated with CLI, wherein the CSI metric comprises at least one of: a Layer 1 signal-to-interference-plus-noise ratio (SINR) metric, a channel quality information metric, a precoding matrix indicator metric, a rank indicator metric, or some combination thereof.

Aspect 19: The method of any of Aspects 12-18, wherein the CSI configuration indicates a set of receive beams of the UE associated with the IMR associated with CLI.

Aspect 20: The method of Aspect 19, wherein the CSI report includes a first CSI metric associated with a first receive beam of the set of receive beams and a second CSI metric associated with a second receive beam of the set of receive beams.

Aspect 21: The method of any of Aspects 12-20, wherein the IMR associated with CLI is a zero power IMR.

Aspect 22: The method of any of Aspects 12-21, wherein the IMR associated with CLI is a non-zero power IMR.

Aspect 23: The method of Aspect 22, wherein the UE is a first UE, and wherein the method further comprises configuring a second UE to transmit a sounding reference signal in the IMR.

Aspect 24: The method of Aspect 22, wherein the UE is a first UE, and wherein the method further comprises configuring a second UE to transmit an uplink demodulation reference signal in the IMR.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive a channel state information (CSI) configuration indicating an interference measurement resource (IMR) associated with downlink interference and an IMR associated with cross-link interference (CLI), wherein the CSI configuration indicates a plurality of receive beams of the UE; and
transmit a CSI report including:
a first CSI metric that is based at least in part on a measurement on the IMR associated with CLI using each receive beam of the plurality of receive beams,
a second CSI metric that is not based at least in part on the measurement, wherein the second CSI metric is based at least in part on the IMR associated with downlink interference, and
a third CSI metric that is based at least in part on a channel measurement resource measurement corresponding to a power level of a set of downlink reference signals received by the UE.

2. The apparatus of claim 1, wherein the one or more processors are further configured to receive configuration information indicating whether the CSI report is to be based at least in part on the measurement on the IMR associated with CLI.

3. The apparatus of claim 1, wherein the first CSI metric comprises at least one of:
a Layer 1 signal-to-interference-plus-noise ratio (SINR) metric,
a channel quality information metric,
a precoding matrix indicator metric, or
a rank indicator metric.

4. The apparatus of claim 1, wherein the second CSI metric is associated with at least one receive beam of the plurality of receive beams.

5. The apparatus of claim 1, wherein the IMR associated with CLI is a zero power IMR.

6. The apparatus of claim 1, wherein the IMR associated with CLI is a non-zero power IMR.

7. The apparatus of claim 1, wherein the measurement is on a sounding reference signal transmitted in the IMR.

8. The apparatus of claim 1, wherein the measurement is on an uplink demodulation reference signal transmitted in the IMR.

9. The apparatus of claim 1, wherein the third CSI metric corresponds to at least one receive beam of the plurality of receive beams.

10. The apparatus of claim 1, wherein the CSI configuration indicates a single IMR associated with CLI, and wherein the measurement on the IMR associated with CLI using each receive beam of the plurality of receive beams comprises a measurement on the single IMR using each receive beam.

11. An apparatus for wireless communication at a network entity, comprising:
one or more memories; and
one or more processors, coupled to the one or more memories, configured to:
transmit, to a user equipment (UE), a channel state information (CSI) configuration indicating an interference measurement resource (IMR) associated with downlink interference and an IMR associated with cross-link interference (CLI), wherein the CSI configuration indicates a plurality of receive beams of the UE; and
receive a CSI report including:
a first CSI metric that corresponds to each receive beam of the plurality of receive beams and is based at least in part on a measurement on the IMR associated with CLI,
a second CSI metric that is not based at least in part on the measurement, wherein the second CSI metric is based at least in part on the IMR associated with downlink interference, and
a third CSI metric that is based at least in part on a channel measurement resource measurement corresponding to a power level of a set of downlink reference signals.

12. The apparatus of claim 11, wherein the one or more processors are further configured to:
transmit scheduling information based at least in part on the CSI report.

13. The apparatus of claim 12, wherein the UE is a first UE, wherein the scheduling information relates to at least one of the first UE or a second UE, and wherein the network entity communicates with the first UE and the second UE in a full duplex fashion.

14. The apparatus of claim 11, wherein the one or more processors are further configured to transmit configuration information indicating whether the CSI report is to be based at least in part on the measurement on the IMR associated with CLI.

15. The apparatus of claim 11, wherein the first CSI metric comprises at least one of:
a Layer 1 signal-to-interference-plus-noise ratio (SINR) metric,
a channel quality information metric,
a precoding matrix indicator metric, or
a rank indicator metric.

16. The apparatus of claim 11, wherein the second CSI metric is associated with at least one receive beam of the plurality of receive beams.

17. The apparatus of claim 11, wherein the IMR associated with CLI is a zero power IMR.

18. The apparatus of claim 11, wherein the IMR associated with CLI is a non-zero power IMR.

19. The apparatus of claim 11, wherein the UE is a first UE, and wherein the one or more processors are further configured to:

configure a second UE to transmit a sounding reference signal in the IMR.

20. The apparatus of claim 11, wherein the UE is a first UE, and wherein the one or more processors are further configured to:

configure a second UE to transmit an uplink demodulation reference signal in the IMR.

21. The apparatus of claim 11, wherein the power level of the set of downlink reference signals corresponds to a downlink reference signal received power (RSRP), and wherein the RSRP represents a signal quality of the set of downlink reference signals.

22. A method of wireless communication performed by a user equipment (UE), comprising:

receiving a channel state information (CSI) configuration indicating an interference measurement resource (IMR) associated with downlink interference and an IMR associated with cross-link interference (CLI), wherein the CSI configuration indicates a plurality of receive beams of the UE; and transmitting a CSI report including:

a first CSI metric that is based at least in part on a measurement on the IMR associated with CLI using each receive beam of the plurality of receive beams, a second CSI metric that is not based at least in part on the measurement, wherein the second CSI metric is based at least in part on the IMR associated with downlink interference, and a third CSI metric that is based at least in part on a channel measurement resource measurement corresponding to a power level of a set of downlink reference signals received by the UE.

23. The method of claim 22, further comprising receiving configuration information indicating whether the CSI report is to be based at least in part on the measurement on the IMR associated with CLI.

24. The method of claim 22, wherein the first CSI metric comprises at least one of:

a Layer 1 signal-to-interference-plus-noise ratio (SINR) metric, a channel quality information metric, a precoding matrix indicator metric, or a rank indicator metric.

25. The method of claim 22, wherein the CSI configuration indicates a single IMR associated with CLI, and wherein the measurement on the IMR associated with CLI using each receive beam of the plurality of receive beams comprises measuring the single IMR using each receive beam.

26. A method of wireless communication performed by a network entity, comprising:

transmitting, to a user equipment (UE), a channel state information (CSI) configuration indicating an interference measurement resource (IMR) associated with downlink interference and an IMR associated with cross-link interference (CLI), wherein the CSI configuration indicates a plurality of receive beams of the UE; and receiving a CSI report including:

a first CSI metric that corresponds to each receive beam of the plurality of receive beams and is based at least in part on a measurement on the IMR associated with CLI, a second CSI metric that is not based at least in part on the measurement, wherein the second CSI metric is based at least in part on the IMR associated with downlink interference, and a third CSI metric that is based at least in part on a channel measurement resource measurement corresponding to a power level of a set of downlink reference signals.

27. The method of claim 26, further comprising:

transmitting scheduling information based at least in part on the CSI report.

28. The method of claim 27, wherein the UE is a first UE, wherein the scheduling information relates to at least one of the first UE or a second UE, and wherein the network entity communicates with the first UE and the second UE in a full duplex fashion.

29. The method of claim 22, wherein the third CSI metric is associated with at least one receive beam of the plurality of receive beams.

30. The method of claim 26, wherein the third CSI metric is associated with at least one receive beam of the plurality of receive beams.

* * * * *